March 9, 1954  R. B. JACOBS  2,671,341
CONTINUOUS MEASUREMENT OF GASOLINE VAPOR PRESSURE
Filed Sept. 30, 1950
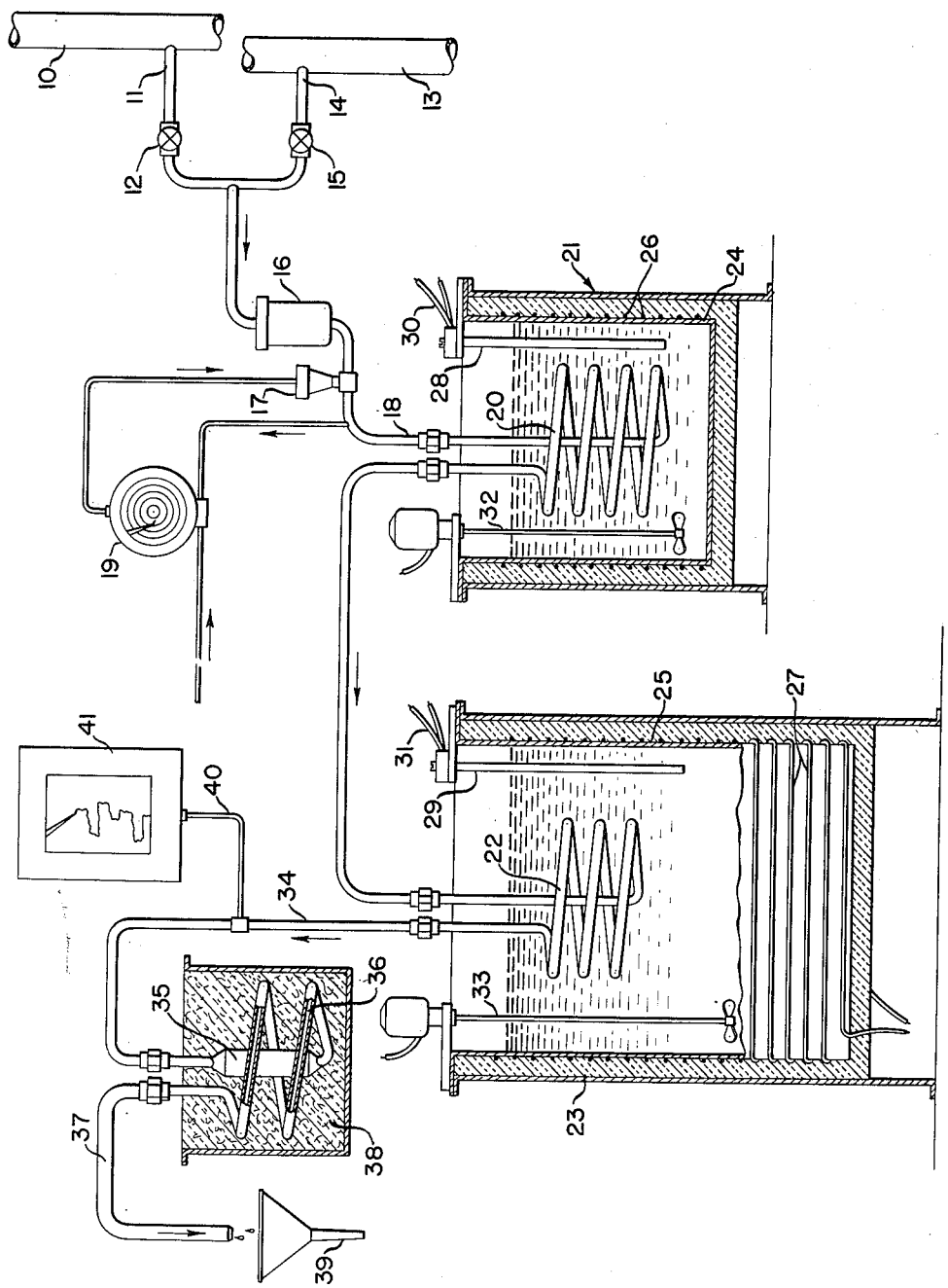
INVENTOR:
ROBERT B. JACOBS.
BY: Everett A. Johnson
ATTORNEY:

Patented Mar. 9, 1954

2,671,341

UNITED STATES PATENT OFFICE 2,671,341

CONTINUOUS MEASUREMENT OF GASOLINE VAPOR PRESSURE

Robert B. Jacobs, Homewood, Ill., assignor to Standard Oil Company, Chicago, Ill., a corporation of Indiana Application September 30, 1950, Serial No. 187,773

15 Claims. (Cl. 73—53)

1

This invention relates to an improved method and apparatus for automatically determining the vapor pressure of liquids. It has particular reference to an apparatus for automatically and continuously measuring the vapor pressure under controlled temperature conditions. More specifically, the invention relates to means for continuously recording the vapor pressure and for controlling other apparatus and methods in response to the vapor pressure.

In the refining of petroleum, there is obtained a range of products from the butanes through the gasoline stocks and heating oils all the way down to the asphalt, separated on the basis of relative volatility. Such separations are usually based on temperature, and an accurate determination of the volatility or vapor pressure is not required. However, when stocks are reblended to build up specific products such as gasoline, an accurate knowledge of the vapor pressure is most essential. For example, it has been found that according to the seasons of the year a certain volatility in gasoline is required, since too high a volatility can lead to vapor lock and too low a volatility makes for hard starting. Furthermore, the different economic values of the stocks which make up the gasoline place a premium on accurate blending which achieves the correct volatility but at the same time utilizes the heavy and light constituents most economically.

As is well known, the vapor pressure of liquids can be determined by withdrawing a batch sample from a pipe line or reservoir and thereafter measuring the pressure exerted by the vapor of the liquid at a controlled constant temperature. Conventionally vapor pressures of petroleum products are measured by the so-called "Standard Reid Test" as described in the ASTM Code D 323-43 which was originally devised in 1930. This is essentially a laboratory method which for maximum accuracy requires very careful manipulation as well as very careful sampling and refrigeration of samples for storage. The test gives reliable results only if the involved procedure is carefully followed.

The actual manipulation time for a standard Reid test is approximately 15 minutes per sample but the total elapsed testing time, including chilling time, generally amounts to several hours. In the usual case where samples are drawn by operators delivered to a technical service laboratory and there measured, the total elapsed time from the drawing of the sample to the reporting back by the laboratory generally is of the order of about four hours. Obviously in operations where large quantities of material are handled, the difference between control based on up-to-the-minute information and that based on information which is four hours late is satisfactory neither from the quality of product nor the economy of operations.

2

The Standard Reid Test provides reasonably accurate results but is subject to errors of manipulation and it is a comparatively slow procedure even when carried out by a highly skilled operator. Moreover, in ordinary blending operations as much as 5000 barrels of gasoline per hour may be produced during which the composition of the streams being blended may change materially, thus influencing the properties of the product. If the blending operator must wait a half hour or longer after any change in the operating conditions before he can determine the effect of the change on the product, he obviously may be unable to prevent the occurrence of substantial deviations from the prescribed range of vapor pressure during such time. Accordingly at a subsequent check test the blended product will not meet specifications of vapor pressure and would be reblended.

Efforts have been made to devise equipment for measuring the so-called "true vapor pressure" of the gasoline by passing a side stream into an evaporating cup type apparatus and measuring the pressure developed therein. However, such vapor pressure apparatus has not proved successful for the continuous recording of vapor pressure and control of blending operations. One difficulty which makes such prior technique unsatisfactory is that virtually all gasoline streams contain traces of dissolved or entrained non-condensable gases such as air and hydrocarbons which come out of solution and accumulate in the testing apparatus rendering the device unreliable and ultimately inoperative.

A system for continuous vapor pressure measurement which avoids these difficulties has been devised jointly by me with Sixt F. Kapff and described by us in an application Serial No. 141,101, filed January 28, 1950, and entitled Vapor Pressure Device (of which this application is a continuation-in-part). Briefly stated, the invention described in the copending application resides in a novel method and apparatus for determining the vapor pressure of liquids wherein the liquid under test is passed through a first capillary resistance, a preheater coil, a vaporization chamber, and a second capillary resistance in series. A relatively higher temperature is maintained about the second capillary resistance and a pressure-responsive device intermediate the outlet of the first resistance and the inlet of the second resistance is used to determine the pressure drop across the higher temperature resistance. The more volatile the liquid the greater the amount of frothing which will take place in the second capillary and the greater this volume the greater the resistance to flow for a given quantity of liquid. Accordingly, the resistance to flow in the second capillary will increase as volatility increases, whereas the resistance to flow in the first capillary remains substantially constant, and the percentage of the total pressure drop which takes place across the second capillary we have found to be a function of the liquid volatility.

It is a primary object of the present invention to provide improvements in apparatus and method for continuously and automatically determining the vapor pressure of liquids of wide boiling range. Another object of the invention is to provide an improved continuous vapor pressure determining apparatus wherein the problem of the accumulation of fixed gases in the apparatus is substantially eliminated.

A further object of the invention is the provision of a highly simplified method and apparatus for the determination of the vapor pressure of a liquid which is of simple and rugged construction and utilizes a minimum of mechanical elements. Still another object of the invention is to provide method and means for determining the vapor pressure of hydrocarbon streams comprising a blend of materials having a wide range of volatility. An additional object of the invention is to provide a method and means for the spontaneous and accurate control of blending hydrocarbon streams of different volatility to obtain a product stream of the desired vapor pressure characteristics. Another object of the invention is to provide a mechanical device for accurately measuring and recording the vapor pressure of successive flows of hydrocarbon liquids through a pipe line which can be operated without the attention of highly skilled operating personnel. These and other objects of the invention will become apparent as the description thereof proceeds.

Briefly, the present invention attains the above and other objects by placing the second capillary in an insulated compartment wherein the boiling occurs under approximately adiabatic conditions. In this arrangement, I have discovered that the greater amount of latent heat associated with the boiling of the low butane gasoline will result in greater cooling by adiabatic boiling than is the case with the equivalent high butane gasoline. This differential cooling by adiabatic boiling provides compensation for the automatically greater degree of foaming of the low butane gasoline under isothermal conditions. Accordingly, the pressure drop through the adiabatic capillary will increase as volatility increases and the total pressure drop which takes place across the adiabatic portion of the apparatus is an accurate indication of the gasoline's volatility.

In performing the method according to my invention, the liquid is supplied to the inlet capillary at a uniform pressure and passed therethrough at a temperature below the boiling point of the liquid at the said pressure. The liquid is then passed through the preheating coil where the liquid is raised to about 140° F. before being introduced into the adiabatic frothing zone. The froth is formed in the adiabatic zone and when it is attempted to pass the liquid and vapors as a foam through the second capillary resistance, the increased volume of the substantially homogeneous vapor-liquid mixture or foam produced in the adiabatic vaporization zone will resist passage through the capillary tube and create a back pressure which is measured.

A uniform foam for froth should be produced and the liquid leaving the preheater coil should contain sufficient heat so as to prevent the passage of slugs of liquid through the vaporization chamber and the adiabatic or exit capillary superheating of peripheral liquid passing through the second or adiabatic capillary and consequent pressure errors are avoided by interrupting streamlined flow through the exit tube, for example by means of roughened inner surfaces, to provide agitation of the flowing fluid. If the inner surfaces are very smooth as in the case of the stainless steel tube, other means can be employed to interrupt the streamlined flow, as for example by providing enlargements of constrictions in the capillary.

The apparatus according to the present invention has been successfully employed in the continuous determination of gasoline vapor pressure in blending operations and pipe line transportation and is hereinafter described in greater detail in connection with the accompanying drawing, which is a schematic view showing in elevation, and with some parts broken away, the dual or paired capillary apparatus.

Referring to the drawing, a feed line 10 is tapped by sample line 11 having a valve 12. A second feed line 13 and sample line 14 having valve 15 can be manifolded to the apparatus as shown where it is desired to obtain vapor pressure data from more than one feed line for substantial periods but not necessarily for a calendar day. A sample is withdrawn from the selected feed line through the associated sample line and into the filter 16 wherein sediment and suspended solids such as rust and the like are removed. The sample then flows through a pressure regulator 17 in line 18 having a gage 19 attached thereto. The filtered sample then flows under controlled pressure into capillary feed line 20 of selected diameter and length, for example an inside diameter of 0.03 inch and about 8 feet long. The capillary 20 is immersed in a constant temperature bath 21 in heat interchange relationship with the liquid therein and is raised to a temperature of about 90° F. which is below the boiling point of the sample.

The liquid sample then flows from the capillary feed line 20 into a preheating coil 22 which is immersed in a second constant temperature bath 23. The preheating coil 22 may be about 6 feet long and about 0.125 to 0.25 inch in diameter.

The constant temperature baths 21 and 23 comprise insulated vessels 24 and 25 having coil heaters 26 and 27 wrapped about them. The heat input to the heaters 26 and 27 is controlled in order to maintain the baths at constant temperatures by means of thermocouples or cartridge thermoswitch apparatus 28 and 29 that are also immersed in the bath and connected by leads 30 or 31 to a relay means (not shown) whereby current is intermittently supplied to heaters 26 and 27 in response to changes in temperature of the particular bath as determined by the associated switch 28 or 29. An agitating device or stirrer 32 or 33 may be used to provide more uniform circulation of the bath liquid and thus improve the temperature control. Other conventional means of maintaining constant temperature such, for example, as a thermostatted copper block, can be employed in place of either or both of the illustrated constant temperature baths arranged about the inlet capillary 20 and the preheating coil 22.

The preheated sample flows from coil 22 via conduit 34, which is preferably heat insulated, into the vaporizing chamber 35 and through a second capillary 36 communicating with said vaporizing chamber 35, both maintained within the insulated chamber 38 to permit substantially adiabatic boiling therein, and discharges to the atmosphere above liquid receiver 39 through line 37. The inner surface of the capillary tube 36 may be roughened to prevent streamlined flow and may be about 4 feet long and have an inside diameter of about 0.03 inch. In general, the length of the capillary 36 will be about 40 to 60 per cent of the length of the capillary 20 and preferably the capillary 36 is about 50 per cent as long as inlet capillary 20.

A gage line 40, which is preferably liquid filled, leads to gage or recorder 41 and fixed between the outlet end of the capillary feed line 20 and the inlet of the adiabatic vaporizing chamber 35. In the drawings it is attached to conduit 34 between the preheater coil 22 and the adiabatic vaporizer 35. The pressure recorder 41 indicates the variations in pressure that are produced by the vapor-liquid mixture. This pressure can be applied to an indicator or to other pressure responsive means such as a diaphragm valve (not shown) connected to the liquid filled line 40, for translating pressure variations to a control means (not shown), whereby various specific operations can be performed such as opening or closing blending valves in response to the vapor pressure of the sample.

In an example of operation of the vapor pressure apparatus shown in the drawing, the liquid sample is introduced into capillary feed line 20 under a positive pressure of about 30 p. s. i. and the liquid and vapors are exhausted to the atmosphere. The inlet capillary 20 consisted of about 8 feet of tubing having an inside diameter of 0.03 inch and maintained at a temperature of about 90° F. by the bath 21. The preheater tube 22 consisted of about 6 feet of 0.125 inch tubing and the constant temperature bath 23 was maintained at a temperature of 140° F. The outlet capillary tube 36 consisted of 4 feet of 0.03 inch inside diameter capillary tubing whereas the vaporizing chamber 35 comprised an enlarged zone about 1 inch long and 0.25 inch in diameter. Both the vaporizing chamber 35 and the outlet capillary tube 36 were maintained under substantially adiabatic conditions by surrounding them with glass wool as insulation in chamber 38.

Gasoline was introduced into the apparatus at a feed rate of about one gallon per hour. The recorder used had a range of 5 to 15 p. s. i. R. V. P. and it was found that deviations in the values for repeated tests on a given sample was less than when successive readings were made according to the standard Reid vapor pressure test. Thus the device according to my invention is both automatic and accurate.

The paired capillary apparatus may be attached to a petroleum products pipe line and the change in the product being transported therein will be rapidly indicated on the gage chart. The pressure-responsive means can in turn be connected so as to operate suitable relays and automatically operable blending valves so that the storage tanks at a petroleum bulk station can be filled with the proper product automatically and in response to a determination of the vapor pressure of the product. Similarly, the apparatus can be used to log the flow of the products through a given section of the pipe line.

In continuous operation, gumming does not impair the accuracy of the installation if a regular program of flushing the capillaries with a suitable solvent such as commercial toluene is employed. In any event calibration of the device can be checked at periodic intervals of about once a week with a pure hydrocarbon, such as cyclopentane, which stores without change in vapor pressure due to weathering and is accordingly easier to handle than a gasoline standard. If desired a pair of adiabatic vaporizer and capillary units can be arranged in parallel and manifolded to line 34 so as to provide uninterrupted operation when the recently on-stream unit is being removed or serviced.

Although my invention has been described in terms of specific apparatus which is described in considerable detail, it should be understood that this is by way of illustration only and that the invention is not limited thereto, since alternative embodiments and operating techniques will become apparent to those skilled in the art in view of my disclosure. Accordingly, modifications in the method and means of my invention are contemplated without departing from the spirit of the described invention or the scope of the appended claims.

I claim:

1. An apparatus for automatically determining the vapor pressure of liquids which comprises in combination a first capillary tube, a heating coil, a vaporizing chamber, and a second capillary tube arranged to provide series flow of fluids therethrough, a constant temperature bath substantially surrounding the first capillary, a second constant temperature bath substantially surrounding the said heating coil, an insulation means substantially surrounding said vaporizing chamber and the second capillary, and a pressure-responsive means in pressure communication with the inlet of said chamber.

2. An apparatus for continuously indicating the vapor pressure of a flowing liquid comprising in combination a conduit into which the liquid is introduced, means for elevating the temperature of a portion of said conduit, means for maintaining an outlet portion of said conduit beyond said zone of elevated temperature under substantially adiabatic conditions, and indicating means responsive to the extent of frothing due to vaporization of liquid in the portion of said conduit maintained under adiabatic conditions.

3. An apparatus for continuously indicating the vapor pressure of a flowing liquid, the said apparatus comprising in combination a conduit into which the liquid is introduced, means for maintaining a temperature differential between an inlet portion and an outlet portion of said conduit, means for heat insulating the outlet portion of said conduit whereby at least a portion of the liquid is subjected to adiabatic vaporization to form a froth, and means responsive to the extent of vaporization within the outlet portion of said conduit.

4. An apparatus for continuously obtaining an indication of the vapor pressure of a flowing liquid comprising in combination a conduit of restricted flow area, means for elevating the temperature of the liquid while passing through a portion of the conduit, means for maintaining an outlet portion of said conduit under substantially adiabatic conditions whereby adiabatic boiling occurs to produce a froth, and means for measuring the pressure drop through the outlet portion of the conduit.

5. An apparatus for continuously determining the apparent vapor pressure of a flowing liquid comprising in combination a conduit of small flow area, means for maintaining an intermediate portion of said conduit at a higher temperature than the inlet portion of said conduit, means for insulating an outlet portion of said conduit whereby frothing is produced in the outlet portion of the conduit due to adiabatic boiling, and means for measuring the pressure drop through the outlet portion as an indication of the vapor pressure of the liquid introduced into said conduit.

6. An apparatus for continuously indicating the vapor pressure of a liquid which comprises a first heated capillary about eight feet long and about 0.03 inch inside diameter, means for supplying liquid to said capillary at uniform pressure, a thermostatted heating means for said first capillary, a preheating coil in fluid communication with the outlet of said first capillary, a thermostatted heating means for said preheating coil, a vaporizing chamber in fluid communication with the outlet of said preheating coil, a second capillary about four feet long and about 0.03 inch inside diameter, means for heat insulating said vaporizing chamber and second capillary and pressure responsive means intermediate said first and second capillaries.

7. The method of determining the vapor pressure of a liquid which comprises the steps of introducing said liquid at a constant pressure into two succeeding zones, maintaining the first of said zones at a substantially constant temperature, adding additional heat to said liquid after it has left the first of said zones and before it is introduced into the second of said zones, so that the liquid is brought at least substantially to its vaporization temperature, flowing the preheated liquid through the second of said zones without adding additional heat whereby adiabatic boiling occurs in said second zone to produce a flow-resisting froth, and determining the pressure drop through said second zone as a measure of the vapor pressure of the liquid.

8. The method of obtaining an indication of the vapor pressure of a liquid which comprises the steps of flowing said liquid through a first stage maintained at a substantially uniform temperature below the boiling point of the liquid, flowing the preheated liquid into a successive stage maintained under adiabatic conditions whereby adiabatic boiling occurs to produce a froth, passing the froth through an adiabatic capillary flow stage, and measuring the pressure drop across the adiabatic capillary as an indication of the vapor pressure of the liquid under test.

9. The method of obtaining an indication of the vapor pressure of a liquid which comprises the steps of flowing said liquid through a preheating stage, an adiabatic vaporization stage and an adiabatic capillary flow stage in series, and determining the pressure drop through the adiabatic vaporization and capillary flow stages as an indication of the vapor pressure of the liquid under test.

10. In the method of controlling the blending of at least two fluid streams to produce the desired liquid product wherein the blending operation is controlled in response to the vapor pressure of the liquid product the improvement which comprises the steps of flowing the liquid product through a heated zone at an elevated temperature, introducing the heated liquid product stream into a subsequent insulated zone wherein the liquid product boils adiabatically to produce a uniform froth, flowing the produced froth stream through a restricted flow area, and measuring the pressure on the stream at the inlet to the adiabatic boiling stage thereby detecting the differential resistance to flow of the unvaporized liquid product stream and of the froth product stream.

11. In the method of controlling the blending of at least two fluid streams to produce the desired product the improvement which comprises the steps of flowing the liquid product through the first heated stage and the second heated stage in series, introducing the so heated liquid product into a third adiabatic stage wherein a portion of the flowing product is adiabatically vaporized to form a froth, flowing the froth through a calibrated capillary tube under adiabatic conditions, and determining the resistance to flow through said adiabatic capillary as an indication of the vapor pressure of the liquid product.

12. The method for continuously obtaining an indication of the vapor pressure of a flowing liquid which comprises the steps of introducing a liquid into a conduit of restricted flow area, elevating the temperature of the liquid while passing through a portion of the conduit, maintaining an outlet portion of said conduit under substantially adiabatic conditions whereby adiabatic boiling occurs to produce a froth, and measuring the pressure drop through the outlet portion of the conduit.

13. An apparatus for determining the vapor pressure of a liquid which comprises in combination means for introducing said liquid at a constant pressure into two succeeding zones, means for maintaining the first of said zones at a substantially constant temperature, means for adding additional heat to said liquid after it has left the first of said zones and before it is introduced into the second of said zones, means for flowing the preheated liquid through the second of said zones without adding additional heat whereby adiabatic boiling occurs in said second zone to produce a flow-resisting froth, and means for determining the pressure drop through said second zone as a measure of the vapor pressure of the liquid.

14. An apparatus for obtaining an indication of the vapor pressure of a liquid which comprises in combination means for flowing said liquid through a first zone, means for maintaining said zone at a substantially uniform temperature below the boiling point of the liquid, means for flowing the preheated liquid into a successive zone maintained under adiabatic conditions whereby adiabatic boiling occurs to produce a froth, an adiabatic capillary means connected to the outlet of said successive zone, and means for measuring the pressure drop across the adiabatic capillary means as an indication of the vapor of the liquid under test.

15. An apparatus for obtaining an indication of the vapor pressure of a liquid which comprises in combination means for flowing said liquid through a pre-heating chamber, an adiabatic vaporization chamber, and an adiabatic capillary flow means in series, and means for determining the pressure drop in the adiabatic vaporization chamber and capillary flow means as an indication of the vapor pressure of the liquid under test.

ROBERT B. JACOBS.

References Cited in the file of this patent

UNITED STATES PATENTS

| Number | Name | Date |
|---|---|---|
| 2,002,101 | Valbey et al. | May 21, 1935 |
| 2,119,786 | Kallam | June 7, 1938 |